(12) United States Patent
Shulman et al.

(10) Patent No.: US 9,781,133 B2
(45) Date of Patent: *Oct. 3, 2017

(54) AUTOMATIC STABILITY DETERMINATION AND DEPLOYMENT OF DISCRETE PARTS OF A PROFILE REPRESENTING NORMAL BEHAVIOR TO PROVIDE FAST PROTECTION OF WEB APPLICATIONS

(71) Applicant: Imperva, Inc., Redwood Shores, CA (US)

(72) Inventors: Amichai Shulman, Tel-Aviv (IL); Michael Boodaei, Givataim (IL); Shlomo Kramer, Tel-Aviv (IL)

(73) Assignee: Imperva, Inc., Redwood City, CA (US)

( * ) Notice: Subject to any disclaimer, the term of this patent is extended or adjusted under 35 U.S.C. 154(b) by 556 days.

This patent is subject to a terminal disclaimer.

(21) Appl. No.: 14/254,564

(22) Filed: Apr. 16, 2014

(65) Prior Publication Data

US 2014/0230058 A1  Aug. 14, 2014

Related U.S. Application Data

(63) Continuation of application No. 12/814,753, filed on Jun. 14, 2010, now Pat. No. 8,713,682, which is a (Continued)

(51) Int. Cl.
*H04L 29/06* (2006.01)
*G06F 17/30* (2006.01)
(Continued)

(52) U.S. Cl.
CPC ........ *H04L 63/14* (2013.01); *G06F 17/30306* (2013.01); *G06F 21/577* (2013.01);
(Continued)

(58) Field of Classification Search
CPC ..... H04L 63/14; H04L 63/1433; H04L 41/16; H04L 43/00; H04L 12/2602;
(Continued)

(56) References Cited

U.S. PATENT DOCUMENTS 6,243,756 B1   6/2001   Whitmire et al.
6,249,755 B1   6/2001   Yemini et al.
(Continued)

OTHER PUBLICATIONS

Non-Final Office Action, U.S. Appl. No. 10/991,467, dated Dec. 31, 2007, 20 pages.
(Continued)

*Primary Examiner* — John B King
(74) *Attorney, Agent, or Firm* — Nicholson De Vos Webster & Elliott, LLP (57) ABSTRACT

A system for automatic stability determination and deployment of discrete parts of a profile representing normal behavior to provide fast protection of web applications is disclosed. The system, in response to a sensor collecting from HTTP requests sent by the clients to the web application installed on the protected device, automatically creates for a web application a profile with discrete parts that will represent normal behavior so that deviations from the profile can be considered anomalous. The system automatically determines that a first of the discrete parts of the profile has become stable. The system then automatically deploys the first discrete part of the profile to the sensor that now will compare with the first discrete part of the profile subsequent HTTP requests sent by the clients to the web application to detect deviations from the normal behavior represented by the first discrete part.

23 Claims, 6 Drawing Sheets

Related U.S. Application Data continuation of application No. 10/991,467, filed on Nov. 19, 2004, now Pat. No. 7,743,420.

(60) Provisional application No. 60/526,098, filed on Dec. 2, 2003.

(51) Int. Cl.
*H04L 12/26* (2006.01)
*G06F 21/57* (2013.01)
*H04L 12/24* (2006.01)

(52) U.S. Cl.
CPC .............. *H04L 41/16* (2013.01); *H04L 43/00* (2013.01); *H04L 63/1433* (2013.01); *H04L 41/142* (2013.01); *H04L 43/106* (2013.01); *H04L 63/102* (2013.01)

(58) Field of Classification Search
CPC ... H04L 43/106; H04L 41/142; H04L 63/102; G06F 21/577; G06F 17/30306
USPC .......................................................... 726/26
See application file for complete search history.

(56) References Cited

U.S. PATENT DOCUMENTS

| | | | |
|---|---|---|---|
| 6,275,939 | B1 | 8/2001 | Garrison |
| 6,279,113 | B1 | 8/2001 | Vaidya |
| 6,321,338 | B1 | 11/2001 | Porras et al. |
| 6,363,489 | B1 | 3/2002 | Comay et al. |
| 6,405,219 | B2 | 6/2002 | Saether et al. |
| 6,405,318 | B1 | 6/2002 | Rowland |
| 6,460,141 | B1 | 10/2002 | Olden |
| 6,477,651 | B1 | 11/2002 | Teal |
| 6,487,666 | B1 | 11/2002 | Shanklin et al. |
| 6,513,122 | B1 | 1/2003 | Magdych et al. |
| 6,584,569 | B2 | 6/2003 | Reshef et al. |
| 6,609,205 | B1 | 8/2003 | Bernhard et al. |
| 7,181,768 | B1 | 2/2007 | Ghosh et al. |
| 7,472,413 | B1 | 12/2008 | Mowshowitz |
| 7,743,420 | B2 | 6/2010 | Shulman et al. |
| 7,752,662 | B2 | 7/2010 | Shulman et al. |
| 2002/0026446 | A1 | 2/2002 | Groos, III et al. |
| 2003/0023873 | A1 | 1/2003 | Ben-Itzhak |
| 2003/0154399 | A1 | 8/2003 | Zuk et al. |
| 2003/0204719 | A1 | 10/2003 | Ben-Itzhak |
| 2005/0172162 | A1 | 8/2005 | Takahashi et al. |

OTHER PUBLICATIONS

Restriction Requirement, U.S. Appl. No. 10/991,467, dated Jul. 10, 2008, 7 pages.
Non-Final Office Action, U.S. Appl. No. 10/991,467, dated Oct. 28, 2008, 15 pages.
Final Office Action, U.S. Appl. No. 10/991,467, dated Sep. 1, 2009, 15 pages.
Notice of Allowance, U.S. Appl. No. 10/991,467, dated Apr. 6, 2010, 11 pages.
*F5 Networks, Inc.* vs. *Imperva, Inc.*, United States District Court for the Western District of Washington (Seattle), Civil Docket for Case #: 2:10-cv-00760-RSM, 8 pages, downloaded from https://ecf.wawd.uscourts.gov/cgi-bin/DktRpt.pl?61044723264 ... on Jan. 24, 2011.
*F5 Networks, Inc.* vs. *Imperva, Inc.*, "Amended Complaint for Patent Infringement," filed Jul. 15, 2010, 17 pages, Case No. 2:10-cv-00760-RSM, Document 15.
*F5 Networks, Inc.* vs. *Imperva, Inc.*, "Imperva, Inc.'s Answer and Counterclaims to F5's Amended Complaint for Patent Infringement," filed Jul. 15, 2010, 9 pages, Case No. 2:10-cv-00760-RSM, Document 17.
*F5 Networks, Inc.* vs. *Imperva, Inc.*, "F5 Networks, Inc.'s Answer, Affirmative Defenses and Counterclaims to Imperva, Inc.'s Counterclaims," filed Aug. 9, 2010, 7 pages, Case No. 2:10-cv-00760-RSM, Document 19.
*F5 Networks, Inc.* vs. *Imperva, Inc.*, "Imperva, Inc.'s Answer to F5 Networks, Inc.'s Counterclaims," filed Sep. 2, 2010, 4 pages, Case No. 2:10-cv-00760-RSM, Document 21.
*F5 Networks, Inc.* vs. *Imperva, Inc.*, "Stipulated Motion and Order to Extend Infringement, Noninfringement, and Invalidity, Deadlines, and Deadline for Proposing Claim Terms to Construe," filed Oct. 26, 2010, 4 pages, Case No. 2:10-cv-00760-RSM, Document 27.
*F5 Networks, Inc.* vs. *Imperva, Inc.*, "Stipulated Motion and Order to Continue Suspension of Case Schedule for 45 Days for Settlement Discussions," filed Dec. 28, 2010, 4 pages, Case No. 2:10-cv-00760-RSM, Document 31.
Non-Final Office Action, U.S. Appl. No. 12/814,753, dated Sep. 1, 2011, 9 pages.
*F5 Networks, Inc.* vs. *Imperva, Inc.*, "Stipulated Motion and Order of Dismissal," filed Mar. 7, 2011, 2 pages, Case No. 2:10-cv-00760-RSM, Document 33.
Final Office Action, U.S. Appl. No. 12/814,753, dated Apr. 10, 2012, 52 pages.
Non-Final Office Action, U.S. Appl. No. 12/814,753, dated Oct. 21, 2013, 45 pages.
Notice of Allowance, U.S. Appl. No. 12/814,753, dated Feb. 14, 2014, 5 pages.
"Check Point Software Co-Founder Starts New Security Company WebCohort, Raises First Round From Accel Partners," Internet Wire, May 27, 2002, 1 page, WebCohort, Inc.
"Imperva SecureSphere, Securing the Enterprise Application Sphere," Apr. 1, 2004, 2 pages, V. 2.0, Imperva, Inc.
"Imperva Unveils Next Generation Firewall Technology: Dynamic Profiling," Aug. 23, 2004, 2 pages, Imperva, Inc.
"Imperva, SecureSphere, Technical Description," Apr. 2004, 20 pages, Imperva, Inc.
"New product foils hackers who slip through firewalls," Feb. 3, 2003, 2 pages, WebCohort Inc.
"SecureSphere 1.2, Introducing WebCohort SecureSphere1.2," Oct. 2002, 1 page, WebCohort Inc.
"SecureSphere Dynamic Profiling Firewall, Total Application Security," Aug. 20, 2004, 2 pages, Imperva, Inc.
"SecureSphere Management and Reporting," Sep. 26, 2004, 1 page, V. 3.0, Imperva, Inc.
"Securing the Enterprise Application Sphere with WebCohort SecureSphere 1.2," Oct. 2002, 16 pages, WebCohort Inc.
"Securing Your Web Applications Using WebCohort SecureSphere 1.5," Mar. 2003, 25 pages, WebCohort Inc.
"Traditional Web Application Security vs. SecureSphere, A Comparison of Hard Trigger Rules vs. Correlated Attack Validation," Apr. 2004, 10 pages, Imperva, Inc.
"Web Intrusion Prevention: Securing the Enterprise Application Sphere," Oct. 2002, 12 pages, WebCohort Inc.
"WebCohort—Products—SecureSphere—Anomaly Detection," Jul. 2003, 1 page, WebCohort Inc.
"WebCohort—Products—SecureSphere—Network Architecture," Jul. 2003, 1 page, WebCohort Inc.
"WebCohort—Web application and database intrusion prevention," Dec. 2002, 2 pages, WebCohort Inc.
"WebCohort Introduces SecureSphere 1.2, the First Intrusion Prevention Solution for the Entire Enterprise Application Sphere," Internet Wire, Oct. 30, 2002, 2 pages, WebCohort Inc.
Konopnicki, et al., "W3QS: A Query System for the World-Wide Web," 1995, Proceedings of the 21st VLDB Conference, pp. 54-65.
Millet, et al., "Cookies and Web Browser Design: Toward Realizing Informed Consent Online," 2001, ACM, pp. 46-52.
Ye, et al., "Probablistic Networks with Undirected Links for Anomaly Detection," 2000, IEEE.

AUTOMATIC STABILITY DETERMINATION AND DEPLOYMENT OF DISCRETE PARTS OF A PROFILE REPRESENTING NORMAL BEHAVIOR TO PROVIDE FAST PROTECTION OF WEB APPLICATIONS

CROSS REFERENCE TO RELATED APPLICATIONS

This application is a continuation of U.S. patent application Ser. No. 12/814,753, filed on Jun. 14, 2010, which is a continuation of U.S. Pat. No. 7,743,420, filed on Nov. 19, 2004, which further claims priority from U.S. Provisional Patent Application No. 60/526,098, filed on Dec. 2, 2003, the entire disclosures of which applications are incorporated by reference.

BACKGROUND OF THE INVENTION

Technical Field of the Invention

The present invention relates generally to comprehensive security systems, and more particularly, to dynamic learning methods and adaptive normal behavior profile (NBP) architectures utilized by comprehensive security systems.

Description of the Related Art

Accessibility, ubiquity and convenience of the Internet rapidly changed the how people access information. The World Wide Web ("WWW"), usually referred to as "the web", is the most popular means for retrieving information on the Internet. The web enables user access to practically an infinite number of resources, such as interlinked hypertext documents accessed by a hypertext transfer protocol (HTTP), or extensible markup language (XML) protocols from servers located around the world.

Enterprises and organizations expose their business information and functionality on the web through software applications, usually referred to as "enterprise applications". The enterprise applications use the Internet technologies and infrastructures. A typical enterprise application is structured as a three-layer system, comprising a presentation layer, a business logic layer and a data access layer. The multiple layers of the enterprise application are interconnected by application protocols, such as HTTP and structured query language (SQL). Enterprise applications provide great opportunities for an organization. However, at the same time, these applications are vulnerable to attack from malicious, irresponsible or criminally minded individual. An application level security system is required to protect enterprise applications from web hackers.

In related art, application level security systems prevent attacks by restricting the network level access to the enterprises applications, based on the applications' attributes. Specifically, the security systems constantly monitor requests received at interfaces and application components, gather application requests from these interfaces, correlate the application requests and match them against predetermined application profiles. These profiles comprise a plurality of application attributes, such as uniform resource locators (URLs), cookies, users' information, Internet protocol (IP) addresses, query statements and others. These attributes determine the normal behavior of the protected application. Application requests that do not match the application profile are identified as potential attacks.

An application profile is created during a learning period through which the security system monitors and learns the normal behavior of users and applications over time. The security system can apply a protection mechanism, only once the profile of a protected application is completed, i.e., when sufficient data is gathered for all attributes comprised in the profile. In addition, some security systems require that the application profile be manually defined. These requirements limit the ability of those security systems to provide a fast protection, since substantial time is required (usually days) in order to complete the application profile. Furthermore, this technique limits security systems from being adaptive to changes in application's behavior.

Therefore, in the view of the limitations introduced in the related art, it would be advantageous to provide a solution that enables a fast protection of enterprise applications by an application level security system.

SUMMARY OF THE INVENTION

The invention has been made in view of the above circumstances and to overcome the above problems and limitations of the prior art.

Additional aspects and advantages of the invention will be set forth in part in the description that follows and in part will be obvious from the description, or may be learned by practice of the invention. The aspects and advantages of the invention may be realized and attained by means of the instrumentalities and combinations particularly pointed out in the appended claims.

A first aspect of the invention provides a method for dynamic learning the behavior of enterprise applications for providing the fast protection of the enterprise applications. The method comprises receiving enterprise application events processed by network sensors and analyzing the enterprise application events. The method further comprises generating an adaptive normal behavior profile (NBP), wherein the adaptive NBP comprises at least a plurality of profile items and each of the plurality profile items comprises a plurality of profile properties. The method further comprises performing statistical analysis to determine if the adaptive NBP is stable. The stable adaptive NBP is distributed to the network sensors connected to the protected devices, and the enterprise applications can reside in the protected device. The protected device can be a web server or a database server. Each of the network sensors can be one of a structured query language (SQL) sensor and a hypertext transfer protocol (HTTP) sensor.

The adaptive NBP has a hierarchic data structure, and can represents a HTTP profile or a SQL profile. The profile property comprises a descriptive value of its corresponding profile item, e.g., maintenance information. The maintenance information can comprise a current state of the profile property, a creation time of the profile property, a link to another profile item, a timestamp of last update, an update sequence number and a number of observations of the corresponded profile item. The current state can be a learn state, an enforceable state and a non-enforceable state, and the profile item comprises at least one of a current state of the profile item and a distinguishable name. More particularly, the current state is at least one of a learn state, a protect state, a deleted state, a decayed state and a merged state.

Analyzing the application events comprises performing a lexical analysis and performing a syntax analysis. The lexical analysis comprises breaking each of the plurality of application events into tokens, and creating a representation of the application event using the tokens' properties. The syntax analysis comprises breaking each of the enterprises application events into functional units, and classifying the functional units as identification units and property units. The identification units are used for identifying the enterprise application event, and the property units describe the property of the enterprise application event. The property units having at least one similar identification unit are gathered to form the profile property, and attached to the profile property corresponding to the profile item. The adaptive NBP is considered stable if at least one of the plurality of profile items or at least one of the plurality of profile properties of the adaptive NBP is stable.

In one embodiment, performing the statistical analysis comprises computing the Bayesian probability for a mistake. In another embodiment, the statistical analysis comprises computing a percentage of learning progress for each profile item and profile property out of the total number of the enterprise application events received over a predefined time, and determining the respective profile item or the profile property as stable if the percentage of learning progress exceeds a predefined threshold.

A second aspect of the invention provides a computer program product, comprising computer-readable media with instructions to enable a computer to implement a method for dynamic learning the behavior of enterprise applications for providing fast the protection of the enterprise applications. The method embodied on the computer program product comprises receiving enterprise application events processed by network sensors and analyzing the enterprise application events. The method embodied on the computer program product further comprises generating an adaptive normal behavior profile (NBP), wherein the adaptive NBP comprises at least a plurality of profile items and each of the plurality profile items comprises a plurality of profile properties. The method embodied on the computer program product further comprises performing statistical analysis to determine if the adaptive NBP is stable. The stable adaptive NBP is distributed to the network sensors connected to the protected devices.

The computer program product creates an adaptive NBP that has a hierarchic data structure, and can represents a HTTP profile or a SQL profile. The profile property comprises a descriptive value of its corresponding profile item, e.g., maintenance information. The maintenance information can comprise a current state of the profile property, a creation time of the profile property, a link to another profile item, a timestamp of last update, an update sequence number and a number of observations of the corresponded profile item. The current state can be a learn state, an enforceable state and a non-enforceable state, and the profile item comprises at least one of a current state of the profile item and a distinguishable name. More particularly, the current state is at least one of a learn state, a protect state, a deleted state, a decayed state and a merged state.

The computer program product analyzes the application events comprises performing a lexical analysis and performing a syntax analysis. The lexical analysis comprises breaking each of the plurality of application events into tokens, and creating a representation of the application event using the tokens' properties. The syntax analysis comprises breaking each of the enterprises application events into functional units, and classifying the functional units as identification units and property units. The identification units are used for identifying the enterprise application event, and the property units describe the property of the enterprise application event. The property units having at least one similar identification unit are gathered to form the profile property, and attached to the profile property corresponding to the profile item. The adaptive NBP is considered stable if at least one of the plurality of profile items or at least one of the plurality of profile properties of the adaptive NBP is stable.

In one embodiment, the computer program product performs the statistical analysis by computing the Bayesian probability for a mistake. In another embodiment, the statistical analysis comprises computing a percentage of learning progress for each profile item and profile property out of the total number of the enterprise application events received over a predefined time, and determining the respective profile item or the profile property as stable if the percentage of learning progress exceeds a predefined threshold.

A third aspect of the present invention is a non-intrusive network security system that utilizes a dynamic process for learning the behavior of enterprise applications to allow for the fast protection of the enterprise applications. The security system comprises a plurality of network sensors capable of collecting, reconstructing and processing enterprise application events and a secure server capable of building adaptive normal behavior profiles (NBPs). The security system further comprises connectivity means enabling the plurality of network sensors to monitor traffic directed to at least devices that require protection. In the security system, the enterprise applications reside in the protected devices, and the protected devices can be web servers and/or a database servers. Each of the network sensors can be a structured query language (SQL) sensor and/or a hypertext transfer protocol (HTTP) sensor.

In the security system, the adaptive NBP is a hierarchic data structure that comprises a plurality of profile items and each of the plurality of the profile items comprises a plurality of profile properties. The adaptive NBP represents at least one of a HTTP profile and a SQL profile. The adaptive NBP is considered stable if at least one of the plurality of profile items or at least one of the plurality of profile properties of the adaptive NBP is stable. The secure sever is capable of distributing the stable adaptive NBP to the network sensors connected to the protected devices.

In the security system, the dynamic learning process comprises receiving the enterprise application events processed by the network sensors, analyzing the enterprise application events and generating the adaptive NBP. The security system analyzes the application events by performing a lexical analysis and performing a syntax analysis. The lexical analysis comprises breaking each of the plurality of application events into tokens, and creating a representation of the application event using the tokens' properties. The syntax analysis comprises breaking each of the enterprises application events into functional units, and classifying the functional units as identification units and property units. The identification units are used for identifying the enterprise application event, and the property units describe the property of the enterprise application event. The property units having at least one similar identification unit are gathered to form the profile property, and attached to the profile property corresponding to the profile item. The adaptive NBP is considered stable if at least one of the plurality of profile items or at least one of the plurality of profile properties of the adaptive NBP is stable. In addition, the security system performs a statistical analysis to determine if the adaptive NBP is stable. For example, in one embodiment, the security system performs the statistical analysis by computing the Bayesian probability for a mistake. In another embodiment, the statistical analysis comprises computing a percentage of learning progress for each profile item and profile property out of the total number of the enterprise application events received over a predefined time, and determining the respective profile item or the profile property as stable if the percentage of learning progress exceeds a predefined threshold.

A fourth aspect of the present invention is an adaptive normal behavior profile (NBP) architecture that enables the fast protection of enterprise applications. The architecture comprises a plurality of profile items, wherein each of the plurality of profile items comprises a plurality of profile properties. The normal behavior profile (NBP) architecture is a hierarchic data structure, and can represent at least one of a HTTP profile and/or a SQL profile. Each of the plurality of profile properties comprises a descriptive value of its corresponding profile item. For example, each of the profile properties may comprise maintenance information. The maintenance information may comprise at least one of a current state of the profile property, a creation time of the profile property, a link to another profile item, a timestamp of last update, an update sequence number and a number of observations of the corresponding profile item. The current state is at least one of a learn state, an enforceable state and a non-enforceable state. Each of the plurality of profile items comprises at least a current state of the profile item and a distinguishable name. The current state comprises at least one of a learn state, a protect state, a deleted state, a decayed state and a merged state.

The profile items of the HTTP profile comprise at least a web server group, a web application, a virtual folder, a URL, a cookie and a parameter. The profile property corresponding to a web server group items comprises at least a list of acceptable web application aliases. The profile properties corresponding to the virtual folder item comprise at least a list of sub-folders of the virtual folder, an indication as whether the virtual folder is directly accessible and properties corresponding to a URL item. The profile properties corresponding to the URL item comprise at least a first indication as whether the URL maintained by the URL item generates a binding HTML form, a second indication as whether the URL maintained by the URL item is used as the first URL of a new session, broken links and broken references. The profile properties corresponding to the cookie item comprise at least one of a length restriction on a cookie value and an indication as whether the cookie item represents a set of actual cookies with the same prefix. The profile properties corresponding to the parameter item comprise at least one of a list of allowed aliases for the parameter name, a length restriction on the parameter's value, a parameter type, a first indication as whether the parameter is bounded to a HTTP response, a second indication as whether the parameter is required for a URL and a third indication as whether the parameter represents a set of actual parameters with a same prefix.

The profile items of the SQL profile comprise at least one of a database server group, a source group, a table access and a query. The profile properties corresponding to the source group items comprise at least a list of source IP addresses, a list of client applications, a list of database accounts, a list of tables and views for the source group, a first indication as whether an access profile should be enforced for the source group, a second indication as whether to allow database manipulation commands for the source group, a third indication as whether to allow access to a system administrator, a fourth indication as whether to allow access to tables in non-default schemas and a fifth indication as whether to allow access to tables in non-default schemas. The profile property corresponding to the table access item comprises at least an enforcement mode for each type of query, and the profile property corresponding to the query item comprises at least the SQL query.

The above and other aspects and advantages of the invention will become apparent from the following detailed description and with reference to the accompanying drawing figures.

BRIEF DESCRIPTION OF THE DRAWINGS

The accompanying drawings, which are incorporated in and constitute a part of this specification illustrate embodiments of the invention and, together with the description, serve to explain the aspects, advantages and principles of the invention. In the drawings.

DESCRIPTION OF THE INVENTION

Figure 1:
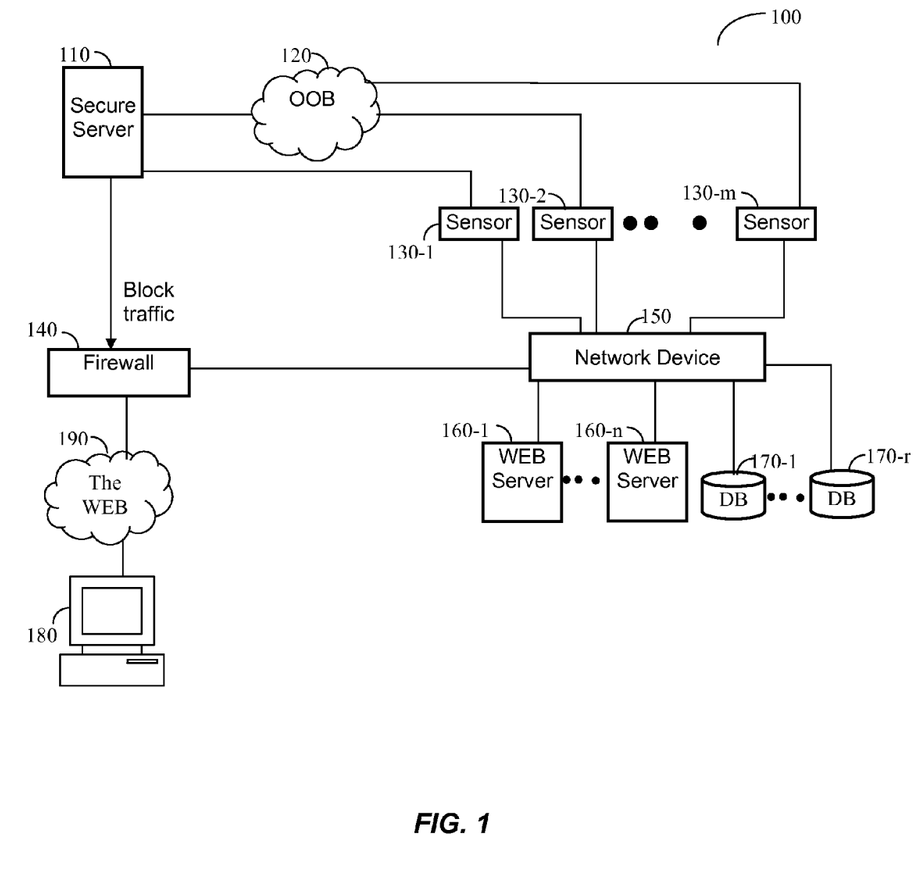
FIG. 1 is an exemplary diagram of an application level security system for illustrating the principles of the disclosed invention.

Referring to FIG. 1, an exemplary application level security system 100 for illustrating the principles of the present invention is shown. A security system 100 comprises a plurality of network sensors 130-1, 130-2, 130-m connected to a secure server 110. The network sensors 130 may be connected to secure server 110 through a conventional network or through an out-of-band network (OOB) 120 for transferring traffic over a dedicated and secure network that is completely separated from the production traffic. A network sensor 130 is placed on each network segment that is coupled to the web servers 160, 160-n and the database servers 170, 170-r to be protected. In one embodiment, the network sensor 130 is a passive sniffing device that taps, gathers and reconstructs requests sent to the protected servers 160, 170 from an attacker machine 180. Network device 150 may be, but is not limited to, a hub, a switch, a tap device, and so on. Network sensor 130 taps the traffic sent to and from Web servers 160 and database servers 170. Network sensor 130 is not installed in the line of traffic between client 180 and Web servers 160 or database server 170, thus traffic is copied to network sensors 130 and at the same time passing directly through. In another embodiment (not shown), the network sensors 130-1, 130-2, 130-m are configured to operate in the line of traffic. Each network sensor 130 processes incoming application requests, which are sent as application events to the secure server 110.

The security system 100 operates in two different modes: a LEARN mode and a PROTECT mode. In one embodiment, in the LEARN mode, the security system 100 monitors and learns the normal behavior of users and applications over time, and builds an adaptive normal behavior profiles (NBP) for each protected entity. In the PROTECT mode, the security system 100 compares real time communications (i.e., application events) to the adaptive NBPs. Deviations from the adaptive NBP are defined as anomalies. Anomalies are further analyzed by advanced correlation and aggregation mechanisms to ensure that the anomalies are part of an attack. The analysis uses positive logic for intrusion detection. That is, if an event matches a profile, it is considered as a normal event, else if the event does not match any profile, it is considered as an irregular event.

Application events may be collected either by analyzing network level protocol attributes of incoming network traffic, or by polling information about recent events from the web servers 160 or the database servers 170. The network sensor 130 is capable of reconstructing application events from a plurality of network level protocols comprising, but not limited to, Oracle Net8™, Microsoft SQL Server™ TDS, Sybase TDS, OpenGroup DRDA, HTTP, encrypted HTTP (HTTPS) and similar applications. In addition, the network sensor 130 is capable of gathering application events by polling information (e.g., SQL queries) from Oracle Database™, Microsoft SQL server and similar systems. Each of network sensors 130-1, 130-2, 130-$m$ operates autonomously, and thus the security system 100 is a scalable system. That is, to protect additional Web applications and databases, the user has just to add additional network sensors 130 to monitor the new protected entity.

Figure 2:
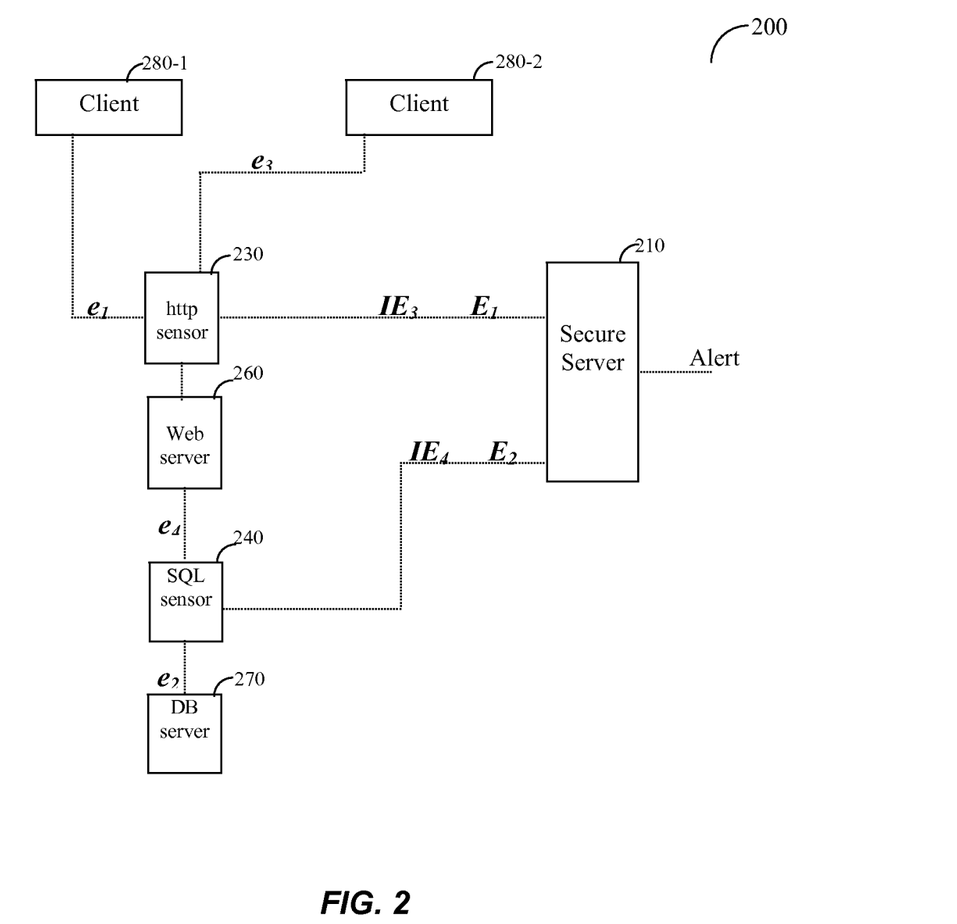
FIG. 2 is an exemplary diagram illustrating the operation of the application level security system in accordance with this invention.

Referring to FIG. 2, an exemplary diagram 200 illustrating the operation of the application level security system 100 is shown. The security system 200 depicted in FIG. 2 comprises two network sensors, a HTTP sensor 230 and a SQL sensor 240. The HTTP sensor 230, capable of gathering and reconstructing HTTP events, collects an HTTP request $e_1$ sent by a client 280-1 to the web server 260. The SQL sensor 240 collects a SQL request $e_2$ by polling the database server 270. The event $e_2$ may be a consequence of request $e_1$. Requests $e_1$ and $e_2$ are processed by sensors 230 and 240, respectively, and are sent as application events $E_1$ and $E_2$ to secure server 210. Subsequently, the secure server 210 executes a profiling process for generating an adaptive NBP for each protected entity, i.e., for the web server 260 and for the database server 270.

To allow fast protection, the security system 200 implements a dynamic learning process for generating the adaptive NBP. Through this process, a decision whether to use an application event for protection or learning is based on a single profile item. Specifically, the generated adaptive NBP comprises a plurality of profile items, wherein each item comprises a plurality of profile properties. The adaptive NBP may be used for protecting the application if at least one profile item is considered stable. In one embodiment, a stable item comprises sufficient information regarding users' or applications' behavior, where sufficiency is based on statistical measures. The statistical measures may be, but not limited to, those described herein.

The adaptive NBP generated by the present invention has a granular architecture allowing decisions to be made for discrete portions of the NPB. Furthermore, the NBP architecture allows the distribution of profile updates between the secure server 210 and the network sensors 230 and 240. The architecture of the adaptive NBP is described in greater detail below.

An approved NBP, i.e., an adaptive NBP that comprises at least one stable profile item, is distributed among the network sensors. A copy held by a network sensor may comprise only a subset of the information existing in the original NBP. The adaptive NBP is distributed from secure server to network sensors through a synchronous communication channel. The network sensors also use this channel to retrieve NBP updates.

In this example, the secure server 210 generates two adaptive NBPs, the first NBP characterizes the web server 260 and is uploaded to the HTTP sensor 230, while the second NBP characterizes the database server 270 and is uploaded to the SQL sensor 240. Once, the NBPs are uploaded to the sensors 230 and 240, the security system 210 can protect the web server 260 and the database server 270 using the stable properties of the NBPs. It should be noted that the security system 210 always protects the web server 260 and the database server 270 using at least signatures detection, protocol analysis and other network means.

In the PROTECT mode, the secure server 210 identifies deviations from at least one stable profile item in the adaptive NBP, analyzes the deviations, detects intrusions and block attacks according to a predefined security policy. Specifically, a HTTP request e3 sent by a client 280-2 to the web server 260 is captured by HTTP the sensor 230 and classified. The request e3 is compared with a copy of an adaptive NBP comprising at least one stable profile item maintained by the HTTP sensor 230. If the request e3 deviates from the adaptive NBP, then the HTTP sensor 230 classifies it as anomalous and sends an irregular event (IE3) to the secure server 210, which further processes the irregular event (IE3) to determine whether or not an intrusion takes place. On the other hand, if the request e3 matches the adaptive NBP, then the HTTP sensor 230 may discard this event, or alternatively, send the request to the secure server 210 for the purpose of amending or updating the adaptive NBP. Simultaneously, a SQL request e4 generated by the web server 260, possibly as a consequence of request e3, is captured by the SQL sensor 240. If the request e4 deviates from the adaptive NBP maintained by SQL sensor 240, this event is declared as irregular event (IE4) and sent to the secure server 210 for further analysis. Both events e3 and e4 may be compared against one stable profile item in each NBP maintained by the HTTP sensor 230 and the SQL sensor 240. The secure server 210 declares an intrusion alert when an event or a series of events triggers a rule based mechanism. The rule-based mechanism includes a predefined set of correlation rules that allow to easily correlate different types of anomalies and set alerts for a combination of anomalies that increases the probability of an attack. The correlation rules are predefined by the user. The rule-based mechanism employs a state machine to define and evaluate correlations between anomalies in real-time. For example, the two irregular events $IE_3$ and $IE_4$ are correlated into a single intrusion alert.

The disclosed security system creates, through the dynamic learning process, the adaptive NBPs without any prior knowledge of the enterprise application semantics. However, the NBPs may be automatically updated while the system is operating in the PROTECT mode. Specifically, adaptive NBPs are updated when the enterprise application undergoes major changes. During the dynamic learning process, the security system tracks certain characteristics in the user activity and stores the tracking data in an internal database. This raw tracking data is not considered as a profile until the data is compiled, analyzed and formed into an adaptive NBP structure.

Figure 3:
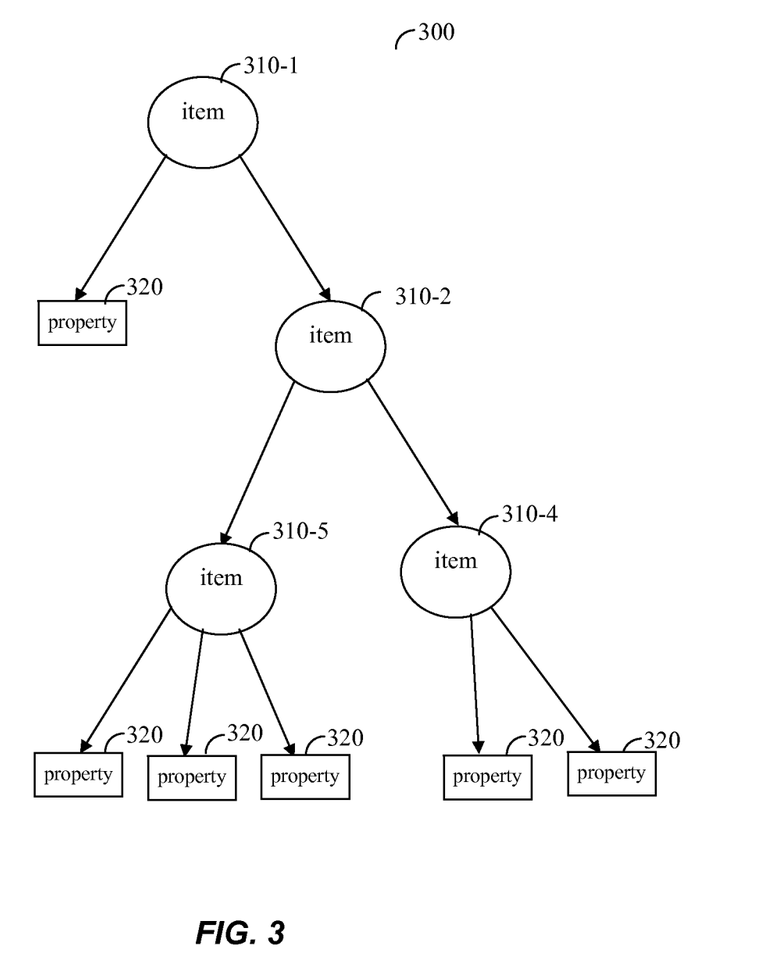
FIG. 3 is a non-limiting diagram of an adaptive NBP architecture.

Referring to FIG. 3, an exemplary diagram illustrating the architecture of an adaptive NBP 300 in accordance with the present invention is shown. The adaptive NBP is hierarchic data structure (e.g., a directed tree) comprising a plurality of profile items 310-1, 310-2, 310-4, 310-5 holding a plurality of corresponding profile properties 320-1, 320-2, 320-3, 320-4, 320-5, 320-6. The child of a profile item 310 may be at least a profile property 320 or another profile item 310. The profile items 310 and properties 320 characterize one or more enterprises applications installed on a server, e.g., a web server or a database server. The profile items 310 are independent, and are the smallest profile entity that can be conveyed individually from the secure server 110 to the network sensors 130. A profile property 320 is a descriptive value of a respective profile item 310. Therefore, an observation of an event related to a profile item results in updating all profile properties of that item. The profile properties 320 contain the actual data of the items, the property type, their current state and an awareness flag. The current state may be either a LEARN state, an ENFORCEABLE state, or a NON-ENFORCEABLE state. In the LEARN state, events relating to the respective profile property are gathered. In the ENFORCEABLE state, the respective profile property contains sufficient amount of information so that this property can be uploaded to a network sensor and used for detecting attacks. The NON-ENFORCEABLE state means that the profile property cannot be uploaded to a network sensor. Each of the profile properties 320 have their own state, but they cannot be handled independently of their containing item (e.g., a specific property cannot be removed from a profile item). The current state may be automatically determined by the secure server 110 or manually by the user. The awareness flag indicates whether this property should be conveyed to a network sensor. A copy of the adaptive NBP transmitted from the secure server 110 to the network sensors 130 may comprise a subset of items affected by the system's configuration (e.g., entities protected by the network sensor 130, policy regarding stable item, and so on) and a subset of properties for each profile item.

Each profile item 310 is identified by a unique hierarchic key, thus the entire set of ancestors from an item's direct parent and up to the root of the profile tree can be determined by a single key. As a parent item may contain various child items, a parent item (e.g., item 310-2) must comprise at least one profile property that explicitly denominates the child profile items (e.g., 310-4 and 310-5) of the parent item. Each profile item 310 is further identified by its implied type and preferably its distinguished name, which are used for classification purposes. Furthermore, each profile item 310 maintains information comprising, but not limited to, a creation time, a current state, a link to another profile item, a timestamp of last update, an update sequence number, a number of observations of item either at the network sensors 130 or the secure server 110 and a named collection of child items. The current state of a profile item may be a LEARN state, a PROTECT state, a DELETED state, a DECAYED state, or a MERGED state. In a LEARN state, events regarding to the respective profile item are gathered. In a PROTECT state, sufficient amount of information is gathered and the profile item is uploaded to a network sensor. A DELETED state indicates that the profile item was deleted. A DECAYED state indicates that a link to the profile item is broken. A MERGED state indicates that the respective profile item was merged with another profile item. The current state may be automatically determined by the secure server 110 or manually by the user.

Figure 4:
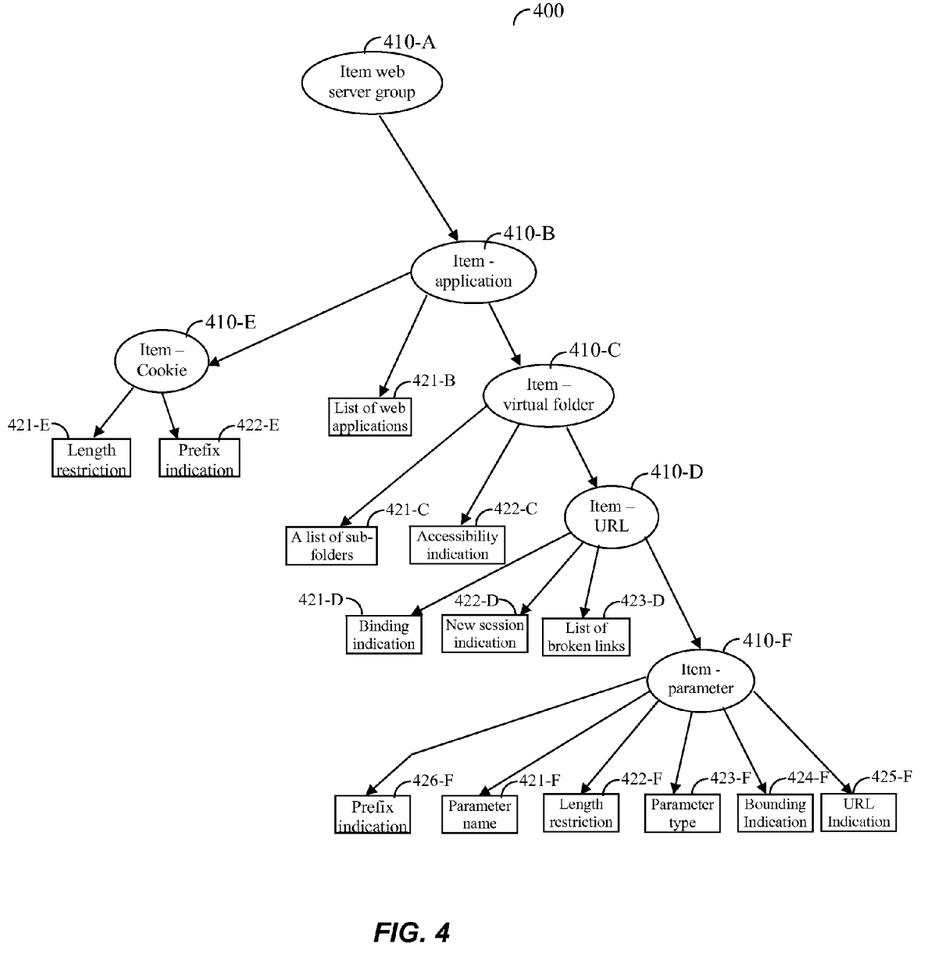
FIG. 4 is a non-limiting diagram of an adaptive NBP architecture characteristic to a HTTP profile.

FIG. 4 shows a non-limiting architecture of an adaptive NBP 400 characteristic to HTTP. The profile items of NBP 400 comprise a web server group 410-A, an application (or host) 410-B, a virtual folder 410-C, a URL 410-D, a cookie 410-E and a parameter 410-F. The web server group item 410-A is the root of the NBP structure 400 and its child is the web application item 410-B. The web application item 410-B describes a single web application in the web server group. The children of the application item 410-B are the virtual folder item 410-C, which defines a virtual folder within a web application and the cookie item 410-E. The distinguished name of the virtual folder item 410-C is the full path of the folder from the virtual root. The cookie item 410-E comprises cookies for a single Web application of its parent item 410-B. The distinguished name of the cookie item 410-E is the name of the cookie. The URL item 410-D is the child of virtual folder item 410-C and describes a single URL within a web application. The distinguished name of the URL item 410-D is the full path of the virtual folder (maintained by item 410-C) together with the HTTP method (e.g., GET or POST). The parameter item 410-F is the child of URL item 410-4 and describes a list of parameters of HTTP requests submitted to a web server. The distinguished name of the parameter item 410-F is the parameter name within the URL.

Each of items 410 may comprise at least one profile property 420 containing the descriptive value of the item. Specifically, the profile property 421-B of application item 410-B is a list of acceptable web application (or host) aliases. The virtual folder item 410-C comprises two profile properties 421-C, 422-C holding, respectively, a list of sub-folders of a virtual folder and indication whether the virtual folder is directly accessible. The profile properties 421-D, 422-D of URL item 410-D comprise two indications, respectively, with one indicating whether the URL maintained by the item generates HTML form used for binding parameter values, and the other indicating whether the URL can be used as the first URL of a new session. In addition, the profile property 423-D comprises a list of identified broken links and broken references. The cookie property 421-E is the length restriction on the cookie values and the property 422-E is an indication whether the cookie represents a set of actual cookies with the same prefix. The parameter properties 421-F, 422-F, 423-F, 424-F, 425-F and 426-F, respectively, comprise a list of allowed aliases for the parameter name, length restriction on the parameter's value, a parameter type, an indication whether the parameter is bounded to a HTTP response, an indication whether the parameter is required for a URL, and an indication whether the parameter represents a set of actual parameters with the same prefix. As can be noted, the web server group item 410-A does not comprise any additional profile properties.

A profile property may further comprise maintenance information comprising, but not limited to, a current state of the profile property, a creation time of the profile property, a link to another profile item, a timestamp of last update, an update sequence number and a number of observations of a corresponding profile item.

Figure 5:
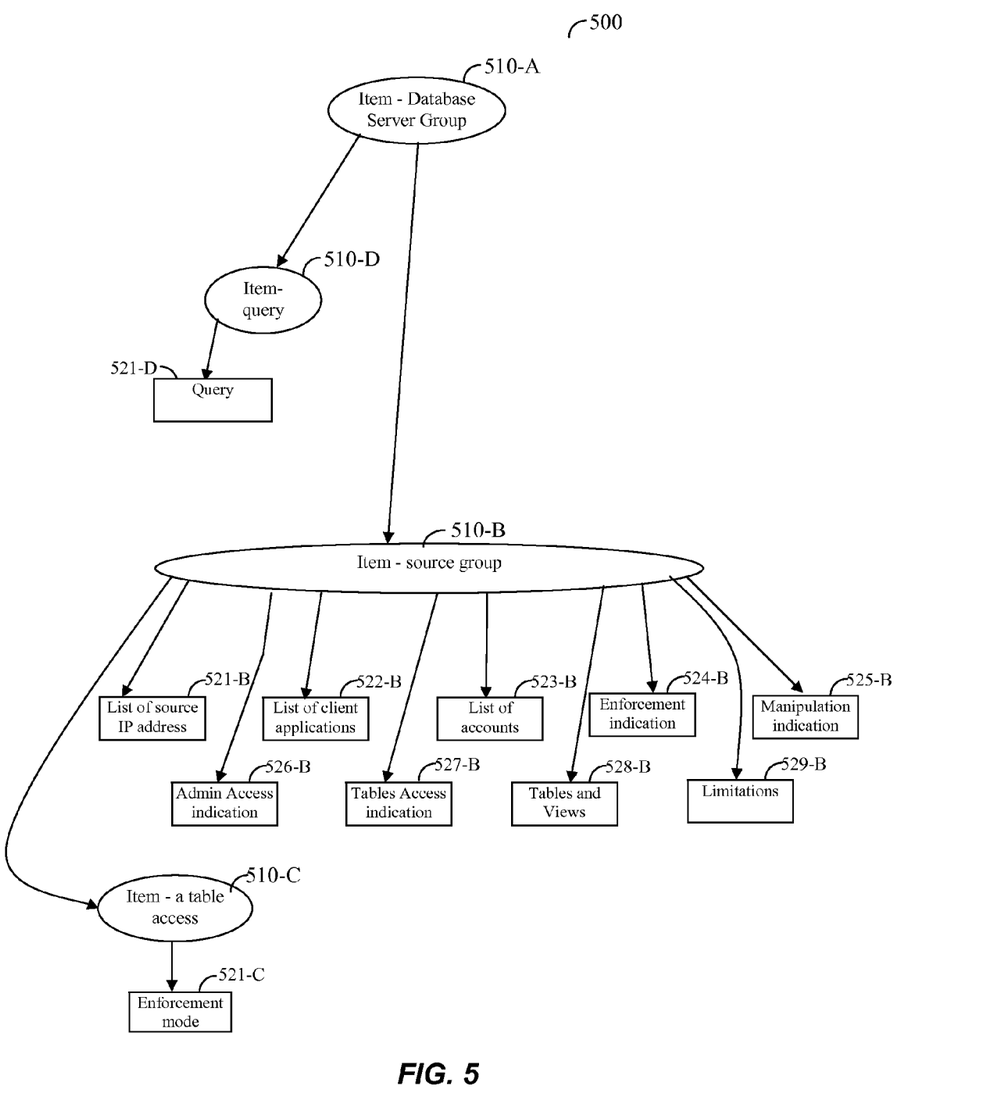
FIG. 5 is a non-limiting diagram of an adaptive NBP architecture characteristic to a SQL profile.

Referring to FIG. 5, a non-limiting architecture of an adaptive NBP architecture 500 that characterizes a SQL profile is shown. The items of NBP 500 comprise a database server group 510-A, a source group 510-B, a table access 510-C and a query 510-D. The database server group item 510-A is the root of the NBP 500 and its children are the source group item 510-B and the query item 510-D. The source group item defines a homogeneous group of database clients having access to database servers. The child of source group item 510-B is the table access item 510-C, which defines the access profile of database clients to a database table. The distinguished name of table access item 510-C is the name of the table. The query item 510-D defines a specific SQL query and its distinguished name is the normalized text of the query. The distinguished names of database server group item 510-A and source group item 510-B comprise default values and are not used for classification.

Each of items 510 may comprise at least one profile property 520 containing the descriptive value of the item. Specifically, the profile properties 521-B, 522-B and 523-B of source group item 510-B comprise a list of source IP address, a list of client applications, and a list of database accounts, each of these lists defines the source group, i.e., the clients that can access database servers. Furthermore, profile properties 524-B, 525-B, 526-B, 527-B, 528-B and 529-B comprise an indication whether the access profile should be enforced for this source group, an indication whether to allow database manipulation commands for this source group, an indication whether to allow access to a system administrator, an indication whether to allow access to tables in non-default schemas, tables and views for this source group, and limitations on the operations of the source group. The profile property 521-C of the table access item 510-C defines the enforcement mode for each type of query, e.g., SELECT, UPDATE, DELETE, INSERT, and so on. The profile property 521-D holds the SQL query. As can be noted, database server group item 510-A does not comprise additional profile properties. It should be noted by a person skilled in the art that these examples are intended for purposes of demonstration only and are not intended to limit the scope of the disclosed invention. As described above for a HTTP profile item, a SQL profile item can have a LEARN state, a PROTECT state, a DELETED state, a DECAYED state and a MERGED state.

Figure 6:
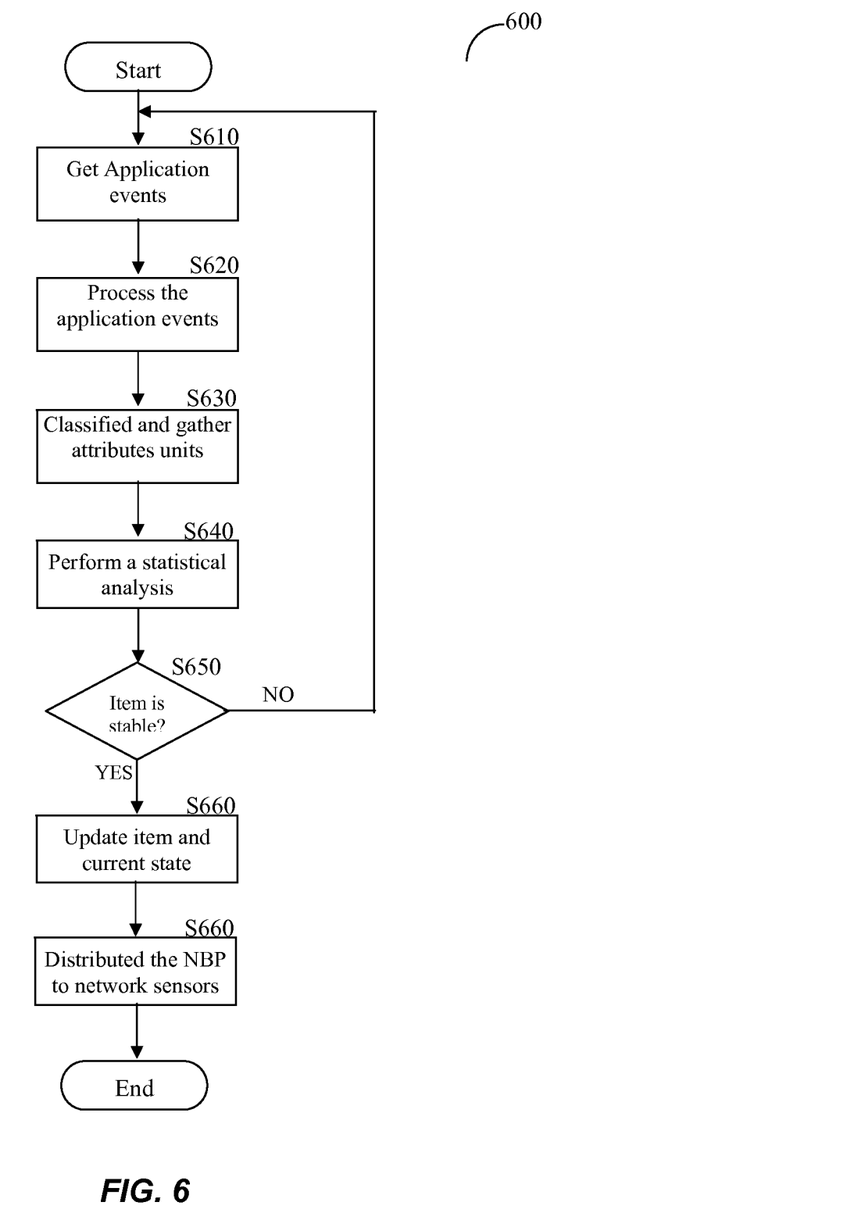
FIG. 6 is an exemplary flowchart describing the dynamic learning process in accordance with an exemplary embodiment of this invention.

Referring to FIG. 6, an exemplary flowchart 600 describing the dynamic learning process, in accordance with an exemplary embodiment of the present invention is shown. The dynamic learning process generates the adaptive NBPs described in greater detailed above. At S610, application events processed by a network sensor 130 are received at the secure server 110. At 5620, the application events are analyzed to create the adaptive NBP. Specifically, in one embodiment, the secure server 110 performs a lexical analysis and a syntax analysis to create the NBP. When performing a lexical analysis, the event is broken into tokens and a representation of the event based on token properties is created. SQL queries are modeled using a lexical analysis by replacing any literals with standard placeholders. When performing a syntax analysis of application events are broken into functional units. Some of the units are used for the purpose of identification of the event (the "identification units") and others are considered to be properties (the "property units"). At S630, the property units having similar identification units are classified, gathered and attached to their respective profile item. For example, URLs having the same path are unified and added to the URL item 410-D. At S640, a statistical analysis is performed to determine if the profile item or profile property is stable. In one embodiment, the statistical analysis computes the percentage of learning progress out of the total number of application events collected over time. If the percentage of learning progress exceeds a predefined threshold, the item is considered stable. The percentage of learning progress is computed for both a profile property and its respective item. In another embodiment, the statistical analysis may be the probability for mistakes computed using Bayesian methods. At S650, a check is made to determine if the item or property is stable, and if so, at S660, the current state of the profile item and property are respectively changed to a PROTECT state and an ENFORCEMENT state; otherwise, execution continues with S610. At S670, the adaptive NBP that comprises at least one stable item is distributed to the network sensors 130 and then the security system 100 can protect the protected servers using the stable items properties of the NBP.

It should be noted that in the protect mode of the security system 100 protection is achieved based on at least one stable item or one stable property comprised in the adaptive NBP. For example, if the length for a first parameter item in a URL is stable and the length a second parameter is not, then the enforcement is made only for the first parameter but not for the second. The processes for determining the stability of a parameter item are discussed above.

In accordance with an embodiment, adaptive NBPs are distributed to the network sensors through a proprietary protocol. The protocol provides at least the following operations: a) add a profile item together with its descendants to an adaptive NBP residing in a network sensor; b) update the NBP if an existing profile item is altered; and c) remove an item and its descendants from the NBP. Any changes made by the secure server 110 are immediately imposed onto the network sensors 130.

The present invention can be implemented in software, hardware, firmware or various combinations thereof. In an embodiment of the present invention, the elements are implemented in software that is stored in a memory and that configures and drives a digital processor situated in the respective wireless device. The software can be stored on any computer-readable media for use by or in connection with any suitable computer-related system or method. It will be appreciated that the term "predetermined operations" and the term "computer system software" mean substantially the same thing for the purposes of this description. It is not necessary to the practice of the present invention that the memory and the processor be physically located in the same place. That is to say, it is foreseen that the processor and the memory might be in different physical pieces of equipment or even in geographically distinct locations.

As used herein, one of skill in the art will appreciate that "media" or "computer-readable media" may comprise a diskette, a tape, a compact disc, an integrated circuit, a cartridge, or any other similar tangible media useable by computers. For example, to distribute computer system software, the supplier might provide a diskette or might transmit the instructions for performing predetermined operations in some form via satellite transmission, via a direct telephone link, or via the Internet. More specific examples of computer-readable media would comprise an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CD-ROM) (optical).

Although computer system software might be "written on" a diskette, "stored in" an integrated circuit, or "carried over" a communications circuit, it will be appreciated that, for the purposes of this discussion, the computer usable media will be referred to as "bearing" the instructions for performing the predetermined operations. Thus, the term "bearing" is intended to encompass the above and all equivalent ways in which instructions for performing predetermined operations are associated with a computer usable media.

Therefore, for the sake of simplicity, the term "program product" is hereafter used to refer to a computer useable media, as defined above, which bears instructions for performing predetermined operations in any form.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

Thus, while only certain embodiments of the invention have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A non-transitory, tangible computer-readable media which has stored in it instructions, which when executed by a computer that participates in protection of a web application that is installed on a protected device and to which clients send hypertext transfer protocol (HTTP) requests, cause the computer to perform the steps of:
    responsive to a sensor collecting the HTTP requests sent by the clients to the web application installed on the protected device, automatically creating for the web application a profile with a plurality of discrete parts that will represent normal behavior so that deviations from the profile can be considered anomalous;
    automatically determining that a first discrete part of the plurality of discrete parts of the profile has become a stable representation of normal behavior so that deviations from the first discrete part can be considered anomalous while a second discrete part of the plurality of discrete parts of the profile is not a stable representation; and
    responsive to the automatically determining, automatically deploying by the computer the first discrete part of the profile to the sensor that now will compare with the first discrete part of the profile subsequent HTTP requests sent by the clients to the web application to detect deviations from the normal behavior represented by the first discrete part but not detect deviations from the normal behavior represented by the second discrete part while the second discrete part of the profile remains not a stable representation.

2. The non-transitory, tangible computer-readable media of claim 1, wherein the instructions, when executed by the computer, also cause the computer to perform the step of:
    responsive to the automatically determining and prior to the automatically deploying, automatically changing a current state of the first discrete part to enforceable.

3. The non-transitory, tangible computer-readable media of claim 1, wherein the automatically creating, automatically determining, and automatically deploying are performed without any prior knowledge of semantics of the web application.

4. The non-transitory, tangible computer-readable media of claim 1, wherein the profile is a hierarchic data structure.

5. The non-transitory, tangible computer-readable media of claim 1, wherein the automatically creating further comprises: performing a lexical analysis; and performing a syntax analysis.

6. The non-transitory, tangible computer-readable media of claim 5, wherein the performing the lexical analysis comprises:
    breaking each of the HTTP requests into tokens; and
    creating a representation of the HTTP requests using properties of the tokens.

7. The non-transitory, tangible computer-readable media of claim 5, wherein the performing the syntax analysis comprises:
    breaking each of the HTTP requests into functional units; and
    classifying the functional units as identification units and property units.

8. The non-transitory, tangible computer-readable media of claim 7, wherein the identification units are used for identifying the HTTP requests.

9. The non-transitory, tangible computer-readable media of claim 7, wherein the property units describe properties of the HTTP requests.

10. The non-transitory, tangible computer-readable media of claim 7, wherein the automatically creating further comprises:
    gathering the property units having at least one similar identification unit to form a profile property; and
    attaching the profile property to its corresponding profile item.

11. The non-transitory, tangible computer-readable media of claim 1, wherein automatically determining comprises computing a Bayesian probability for a mistake.

12. The non-transitory, tangible computer-readable media of claim 1, wherein the automatically determining comprises:
    computing a percentage of learning progress for the discrete parts of the profile; and
    determining the respective discrete part is a stable representation when the percentage of learning progress exceeds a predefined threshold.

13. The non-transitory, tangible computer-readable media of claim 1, wherein:
    the profile comprises a plurality of profile items and a plurality of profile properties, wherein each of the plurality of profile items comprises at least one profile property; and
    the automatically determining comprises:
        computing a percentage of learning progress for each profile item and profile property out of the total number of the HTTP requests received over a predefined time; and
        determining the respective profile item or the profile property is a stable representation when the percentage of learning progress exceeds a predefined threshold.

14. The non-transitory, tangible computer-readable media of claim 1, wherein the profile is an adaptive profile that is automatically updated while the computer is operating in a protect mode.

15. The non-transitory, tangible computer-readable media of claim 1, wherein the sensor sniffs traffic.

16. The non-transitory, tangible computer-readable media of claim 1, wherein the sensor operates in a line of traffic between the clients and the web application.

17. The non-transitory, tangible computer-readable media of claim 1, wherein the discrete parts include a URL item and a parameter item, and wherein profile properties corresponding to the parameter item include a length restriction on a parameter's value and a parameter type for a parameter of HTTP requests.

18. The non-transitory, tangible computer-readable media of claim 17, wherein the URL item describes a single URL within the web application.

19. The non-transitory, tangible computer-readable media of claim 18, wherein the parameter item describes a list of parameters of HTTP requests submitted to the web application.

20. The non-transitory, tangible computer-readable media of claim 1, wherein the automatically creating comprises:
gathering property units having similar identification units to form a profile property, wherein the property units describe properties of the HTTP requests, and wherein the identification units are used for identifying the HTTP requests; and
attaching the profile properties to corresponding profile items that are based on the identification units.

21. The non-transitory, tangible computer-readable media of claim 20, wherein the automatically creating further comprises, prior to the gathering, the following:
performing syntax analysis to generate functional units; and
classifying the functional units as identification units and property units.

22. The non-transitory, tangible computer-readable media of claim 1, wherein said second discrete part is not deployed along with the first discrete part.

23. The non-transitory, tangible computer-readable media of claim 1, wherein said second discrete part is deployed along with the first discrete part although the sensor will not detect deviations from the normal behavior represented by the second discrete part due to the second discrete part of the profile not being a stable representation.

* * * * *